May 4, 1926.
A. K. CHAPMAN ET AL
1,583,656
COMBINED FILM FOOTAGE INDICATOR AND LATCH
Filed August 5, 1925
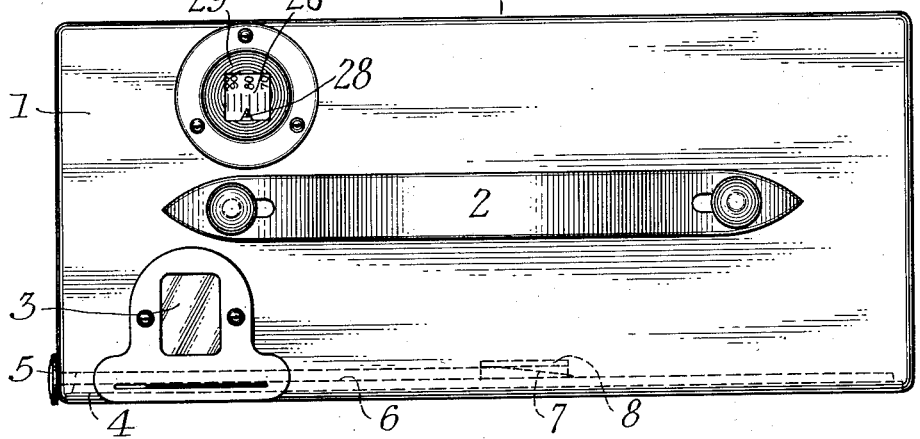
FIG_1_
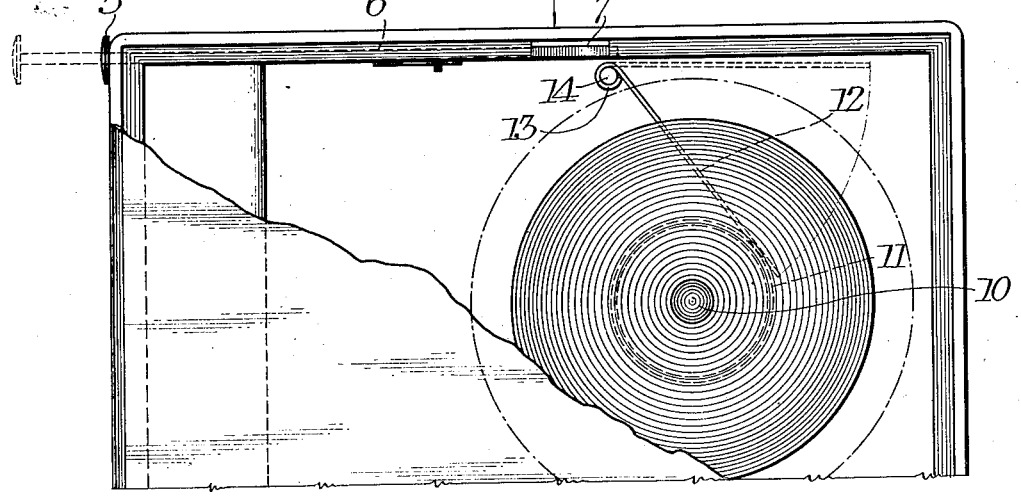
FIG_2_
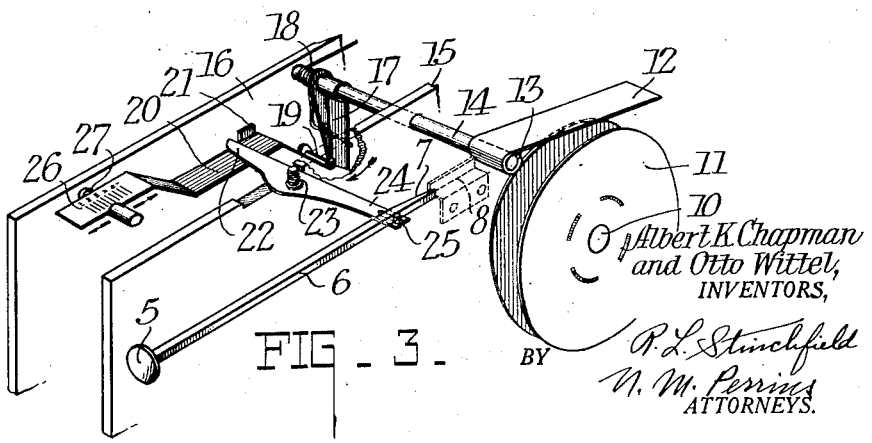
FIG_3_
Albert K. Chapman
and Otto Wittel,
INVENTORS,
BY
ATTORNEYS.

Patented May 4, 1926.

1,583,656

UNITED STATES PATENT OFFICE.

ALBERT K. CHAPMAN AND OTTO WITTEL, OF ROCHESTER, NEW YORK, ASSIGNORS TO EASTMAN KODAK COMPANY, OF ROCHESTER, NEW YORK, A CORPORATION OF NEW YORK.

COMBINED FILM-FOOTAGE INDICATOR AND LATCH.

Application filed August 5, 1925. Serial No. 48,252.

*To all whom it may concern:*

Be it known that we, ALBERT K. CHAPMAN and OTTO WITTEL, citizens of the United States of America and Germany, respectively, residing at Rochester, in the county of Monroe and State of New York, have invented certain new and useful Improvements in Combined Film-Footage Indicators and Latches, of which the following is a full, clear, and exact specification.

This invention relates to motion picture apparatus and more particularly to the means for indicating the amount of film on a reel. A common type of indicator is one in which a leaf bears against an outer convolution of film and controls the movement of a signaling or indicating device. When such a leaf lies between the two flanges of the reel it renders the insertion and removal of the reel difficult. We have overcome this difficulty by connecting the mechanism of such an indicator with a latch which is operated in securing the door of the camera. The features and advantages of our invention will be more fully understood from the following specification, reference being made to the accompanying drawing, in which,—

Fig. 1 is a plan view of a camera embodying our invention;

Fig. 2 is a side view with parts broken away;

Fig. 3 shows the mechanism embodying our invention.

A camera 1 is of a box type having a carrying handle 2 and a finder 3. One side 4 is removable and constitutes the door of the camera. This door carries, upon its inner surface, a sheet metal bracket 8 behind which slides the tapering end 7 of a sliding latch member 6, extending lengthwise of the camera and terminating in a button 5 on the exterior of the front of the camera.

Within the camera is the usual shaft 10, upon which a reel 11, containing film, is placed. A sheet metal leaf 12 is positioned in alignment with the reel, being bent over at one end at 13 where it is secured to a shaft 14 passing through the partition 15 and journaled at its other end in the wall 16. The shaft 14 has a downwardly extending arm 17 secured thereto by which it is pressed by spring 18 in a clockwise direction, so that the leaf 12 normally is impelled between the flanges of the reel against the outermost convolution of the film. The arm 17 is pivoted at 19 to a member 20 which is bent in the manner shown for convenience in operation, and which has, at its end, a cross bar 27 slidable in a slot in the wall 16. The end portion has a scale 26 which is moved beneath a pointer 28 in a sighting window 29 in the top of the camera where it is visible to the user. The member 20 carries a lug 21 engaging one end 22 of a lever 24 which is pivoted at 23 to partition 15 and which at its other end has a slot and pin connection 25 with the bar 6.

In operation the leaf 12 presses down between the flanges of a reel and the scale 26 is so calibrated that it indicates the number of feet of film that has been used or that remains on the film. When the button 5 is pulled out unlatching the door, it swings the lever 24, which pushes lug 21, thus resulting in the turning of shaft 14 and the withdrawing of leaf 12 from between the flanges. The reel 11 may then be readily withdrawn from the shaft 10 without interference from the leaf.

The leaf 12 has the function not only of indicating the footage of the film, but of acting as a tensioning member pressing lightly against the film and preventing its undesired uncoiling. It is to be understood that the above disclosure is by way of example, and that numerous modifications and equivalents are possible, all of which we consider as included in the scope of our invention as defined in the following claims.

Having thus described our invention, what we claim as new and desire to secure by Letters Patent is:

1. A photographic apparatus including a casing, a door for said casing, a latch for the door, means for supporting a film reel within said casing, a member positioned to bear on a coil of film on such a reel, and a connection between the latch and the bearing member adapted to retract the bearing member from its operative position when the latch is operated to unlatch the door.

2. A motion picture apparatus including a casing, a door for said casing, a latch for the door, means for supporting a film reel within said casing, means for indicating the amount of film on such a reel and comprising a member adapted to bear resiliently on a coil of film on such a reel, and means connected to the latch and adapted to retract the bearing member from its operative position when the latch is operated to unlatch the door.

3. A motion picture apparatus including a case, a movable door therein permitting access to the interior of the case, a latch for the door, means for supporting a reel of film within the case, means for indicating the amount of film on such a reel and comprising a member adapted to bear against the outer convolutions of film, and a connection between such member and the latch whereby when the door is unlatched the member will be moved to an inoperative position.

4. A motion picture apparatus including a casing, a door for said casing, a latch for the door having an operating handle on the outside of the casing, means for supporting a film reel within the casing, a film footage indicating means comprising an indicator visible from the outside of the casing, and a member connected to the indicator and positioned within the casing to bear resiliently against a coil of film on a reel supported therein, and a mechanical connection between the latch and the indicating means adapted to retract the bearing member from its operative position when the door is unlatched.

5. A motion picture camera including a light tight casing, a movable door for said casing, a latch carried on the inner side of the door, and a sliding latch carried on the casing, an operating handle connected to the latch and positioned outside of the casing, a film reel support within the casing, a film footage indicating means comprising a movable indicator visible exteriorly of the casing and a member connected to the indicator and adapted to move the same and positioned within the casing to bear against a coil of film on a reel for the support, and a mechanical connection between the latch and the indicating means whereby, when the handle is operated to unlatch the door, the bearing member will be retracted from its operative position.

Signed at Rochester, New York, this 31st day of July, 1925.

ALBERT K. CHAPMAN.
OTTO WITTEL.